United States Patent
Dehlsen et al.

(10) Patent No.: US 8,742,616 B1
(45) Date of Patent: Jun. 3, 2014

(54) BULK ENERGY STORAGE AND FREQUENCY REGULATION OF ELECTRICAL POWER

(75) Inventors: James G. P. Dehlsen, Santa Barbara, CA (US); Mauricio Quintana, Glastonbury, CT (US)

(73) Assignee: Dehlsen Associates, LLC., Santa Barbara, CA (US)

( * ) Notice: Subject to any disclaimer, the term of this patent is extended or adjusted under 35 U.S.C. 154(b) by 0 days.

(21) Appl. No.: 13/481,445

(22) Filed: May 25, 2012

Related U.S. Application Data

(60) Provisional application No. 61/520,063, filed on Jun. 4, 2011.

(51) Int. Cl.
*B61D 43/00* (2006.01)

(52) U.S. Cl.
USPC .............................. 307/9.1; 307/84; 104/289

(58) Field of Classification Search
CPC ........ B61D 43/00; Y02T 30/12; Y02T 30/36; H02K 53/00
USPC .......... 322/4; 290/1 R, 3; 307/47, 67, 68, 9.1, 307/84, 147, 149; 104/289; 105/35
See application file for complete search history.

(56) References Cited

U.S. PATENT DOCUMENTS

| | | | |
|---|---|---|---|
| 1,216,694 A * | 2/1917 | Jenkins | 104/289 |
| 5,065,581 A | 11/1991 | Jenkins | |
| 6,990,906 B2 | 1/2006 | Powell | |
| 7,191,710 B2 | 3/2007 | Powell | |
| 7,430,967 B2 * | 10/2008 | Kumar | 105/35 |
| 7,966,944 B1 | 6/2011 | Fakkema | |
| 2004/0129791 A1* | 7/2004 | Halverson et al. | 238/37 |
| 2009/0032350 A1* | 2/2009 | Shapery | 290/3 |
| 2011/0037275 A1 | 2/2011 | Peitzke et al. | |

* cited by examiner

*Primary Examiner* — Fritz M Fleming
(74) *Attorney, Agent, or Firm* — Mary J. Gaskin

(57) ABSTRACT

A bulk energy storage device for an energy source. The energy storage device includes a circular or conveyor, such as a rail track, which may be formed with slopes. An electrical conductor, such as a third rail or overhead electric cable, connects to an electric grid. Coupled masses, such as rail cars, which travel on the conveyor, have motor/generators that are electrically connected to the conductor. The coupled masses can be raised on a magnetic field and driven by a linear electric motor having a stator embedded in the track and a rotor attached to the undersurface of the masses. Power from the grid is drawn via the third rail to propel and store energy in the ring of masses. When the grid needs to draw power from storage, the linear motor acts as a generator, supplying power to the grid by converting mass momentum into electric power.

10 Claims, 10 Drawing Sheets

BULK ENERGY STORAGE AND FREQUENCY REGULATION OF ELECTRICAL POWER

CROSS-REFERENCE TO RELATED APPLICATION

This application claims the benefit of U.S. Provisional Application No. 61/520,063, filed Jun. 4, 2011.

BACKGROUND OF THE INVENTION

1. Field of Invention

The invention relates to electric power generation, and, more particularly, to bulk energy storage and frequency regulation of electrical power.

2. Description of Prior Art

Energy storage has been an important component of efficient power grid operation. As more renewable energy, particularly wind and solar photovoltaic, is integrated into electric grids, the intermittent and/or periodic nature of these energy resources may be poorly matched to the load pattern on the grid, which can limit the deployment of renewable energy systems. Efficient bulk energy storage enables both a shifting of the delivery time and the amount of energy in order to better match a grid's load pattern.

Various approaches are used for the storage of electric power, including battery, flywheel, and pumped storage devices, along with systems using thermal energy, gravity, buoyancy and compressed air. The approaches present a combination of low efficiency, high capital costs, high energy costs, and/or negative impacts to the environment. For example, some systems utilize masses stored at a particular height, which later descends, to harness the potential energy. Such systems are not appropriate for frequency regulation because of the delay caused by reaction time.

Flywheel systems deployed today operate at very high rotational speeds, which limits the power capacity of these systems due to the fact that known materials have limited strength when subjected to very high centrifugal forces and hoop stresses. These technical constraints limit current flywheel systems to power capacities of no more than a few megawatts per unit. Utilities need systems that can provide 20 or more megawatts of power over a period of time ranging from a few seconds to over 15 minutes. To do so, flywheel installations are presently comprised of multiple small units, increasing the complexity and cost of these systems.

What is needed is bulk (multi-megawatt) energy storage, which is cost effective, easily deployed, and responsive to the rapidly changing needs of either having power drawn from the grid to increase energy in storage, or having energy withdrawn from storage to the grid. The storage system also needs to have minimal mechanical and electrical system losses, as well as minimal windage losses.

SUMMARY OF THE INVENTION

Briefly, the present invention relates to a method and apparatus of bulk (multi-megawatt) energy storage for an energy source, characterized by coupling large masses to form a ring-shaped flywheel, the masses traveling on an electric-powered conveyor; electrically engaging the conveyor with an electrical conductor; and electrically engaging one or more motor/generators on the conveyor with said electrical conductor from an energy source for energy storage and regenerative power delivery, to said energy source.

In accordance with an aspect of the invention, the conveyor is either one or more wheel sets on tracks or a magnetic levitation system, and the electrical conductor is either a rail or an overhead electrical cable or both.

In accordance with a further aspect of the invention and in order to reduce friction and improve efficiency of the system, the coupled masses can be raised on a magnetic field; the masses are driven by a linear electric motor whose stator is embedded in the circular track and whose rotor is attached to the undersurface of the mass carrier structure; whereby power from the grid is drawn via a third rail to both propel and store energy in the ring of masses; and whereby, when the grid needs to draw power from storage, the momentum of the coupled masses attached to the linear electric motor acts as a generator to supply power to the grid by converting kinetic energy into electric power with the corresponding speed reduction in the coupled masses.

In accordance with a further aspect of the invention, the segmented masses structurally form a hoop when the spines of the mass containers are coupled. Cinch cables can be installed on the outer perimeter of the ring of segmented masses. The structure resulting from the use of coupled spines and cinch cables is a coherent circular mass, having no overturning moments of the segmented masses transferred to the conveyor, and minimal or no side loading on the wheels, the rails, or the magnetic levitation tracks.

In accordance with another embodiment of the present invention, slopes introduced into the circular conveyor track minimize friction forces and enable the storage of gravitational potential energy, thereby improving the round trip efficiency of the system.

It is an object of the present invention to use existing materials and rail equipment to store and deliver large amounts of energy in order to address the grid's supply/demand imbalances and to enhance frequency regulation.

Another object of the present invention is to provide a system that can deliver or store energy on demand because it is always in motion on an "infinite" circular track.

DETAILED DESCRIPTION OF THE INVENTION

The present invention is a method and device for bulk energy storage and frequency regulation of electrical power. The invention herein is referred to as the Segmented Mass Circular Conveyor ("SMCC") Energy Storage System. The SMCC system is a type of flywheel energy storage. Flywheels incorporate masses rotating on axles, or masses suspended in magnetic fields; rotational speeds range from very high for small devices to slower speeds for multi-ton flywheels. The scaling and rotational speed of flywheels is limited by the loads on the axles and by the centrifugal forces on the rotating masses. These devices may be aggregated into arrays in order to achieve megawatt scale energy storage.

The five principal components of the SMCC system are an electric powered conveyor, large coupled masses, conveyor wheels with a motor/generator and power supply, and, optionally, magnetic levitation and a linear electric motor/generator. Each of these components is described in the following paragraphs with reference to FIGS. 1 through 8.

Figure 1:
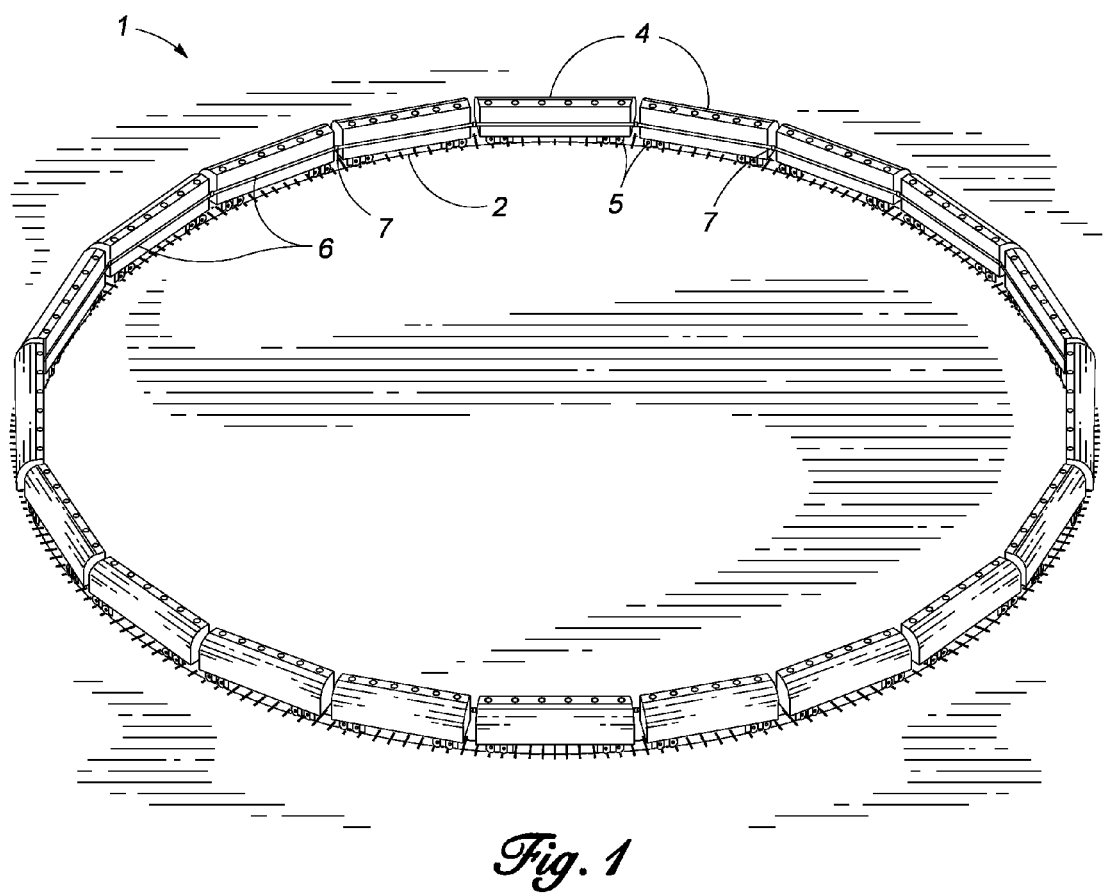
FIG. 1 is a perspective view of the ring of segmented masses, or containers, that form the basic structure of the bulk energy storage system of the present invention.

The SMCC system 1 as shown in FIG. 1 uses a circular conveyor track 2 with a "third rail" electric conductor (3, not shown). The mass segments are large volume containers 4 approximately the size of railroad boxcars and filled with high-density material such as gravel or stone. The segmented containers 4 (here shown on wheels 5) travel at high velocity with high centrifugal force radial to the circular conveyor track 2 and thus have a unique structural design, but with an appearance similar to that of a railroad boxcar. Each container 4 has a load-bearing spine 6 running horizontally along its inner face, positioned to the center of mass for the centrifugal loads. Coupling mechanisms 7 firmly link the spines 6 of adjoining containers 4 together, forming a hoop of tightly-linked mass containers 4. The hoop strength of the interlinked spines 6 allows for rapid travel of the ring of containers 4 on the conveyor track 2, while minimizing lateral (axial) loading of the container wheels 5 against the rails of the track 2, and also restraining against the overturning of the containers 4 due to centrifugal forces. The resulting hoop has a minimum radius of approximately 90 meters.

Figure 2:
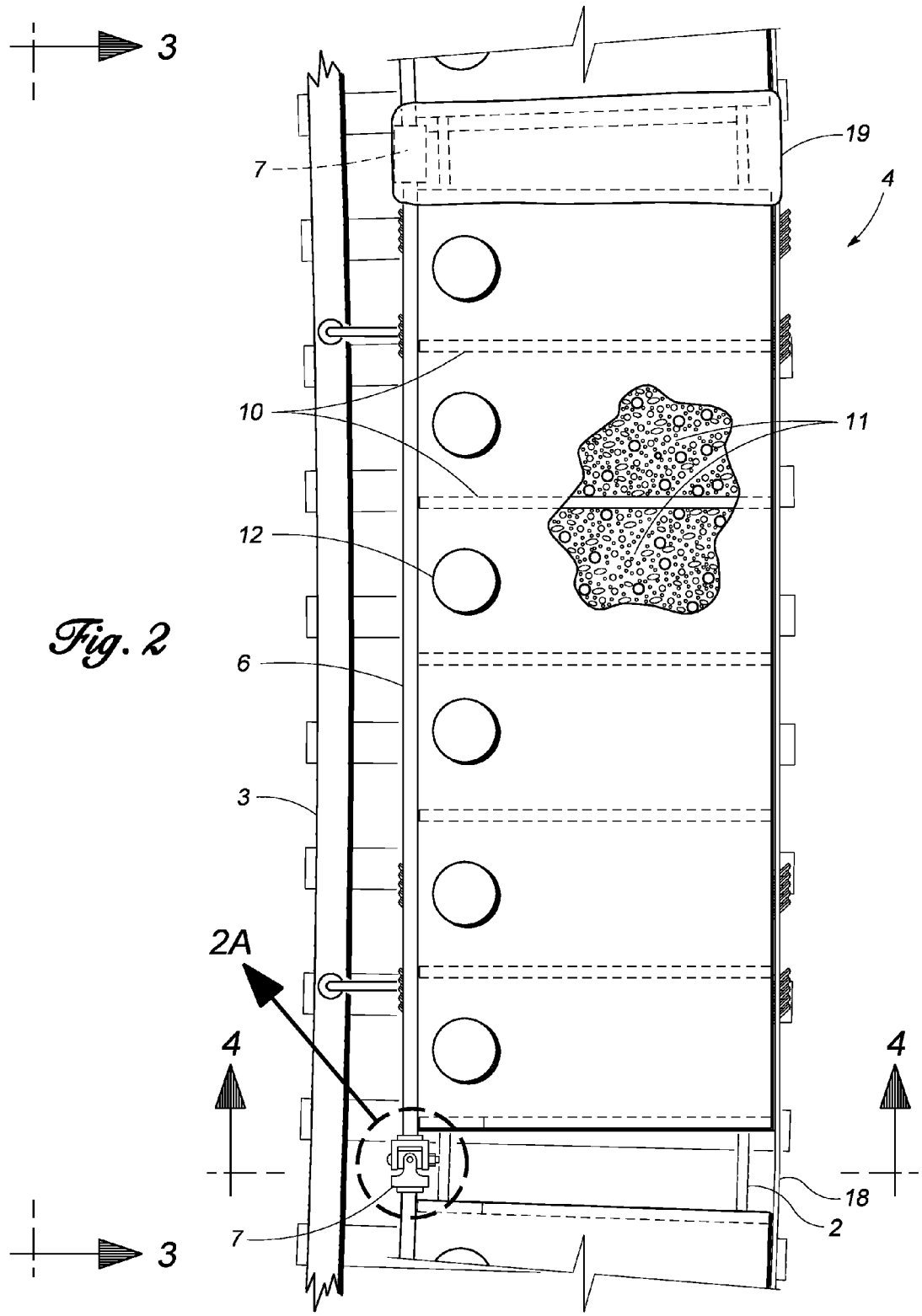
FIG. 2 is a top view of one of the containers shown in FIG. 1.
Figure 3:
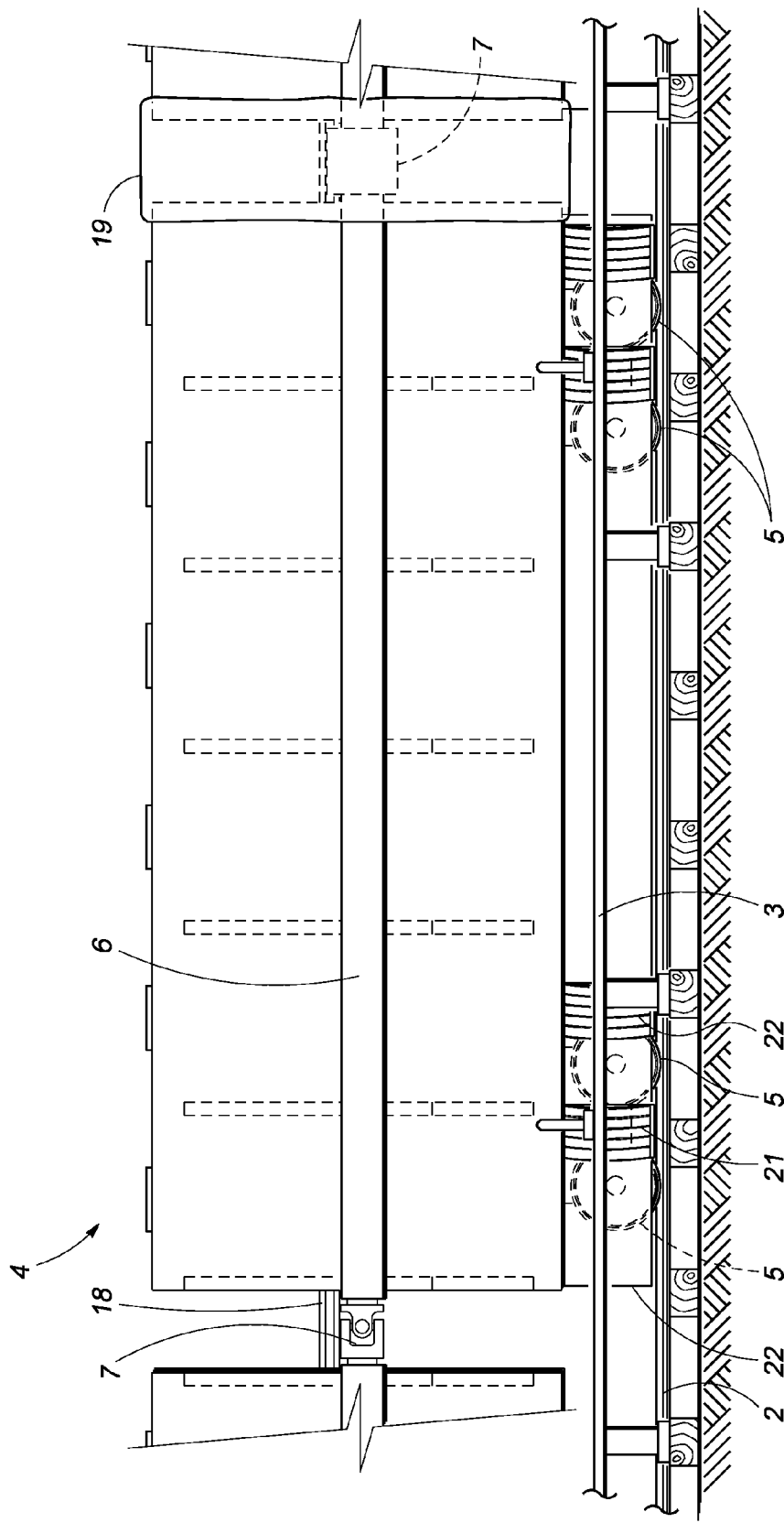
FIG. 3 is a side view of the container shown in FIG. 2, taken along line 3-3.
Figure 4:
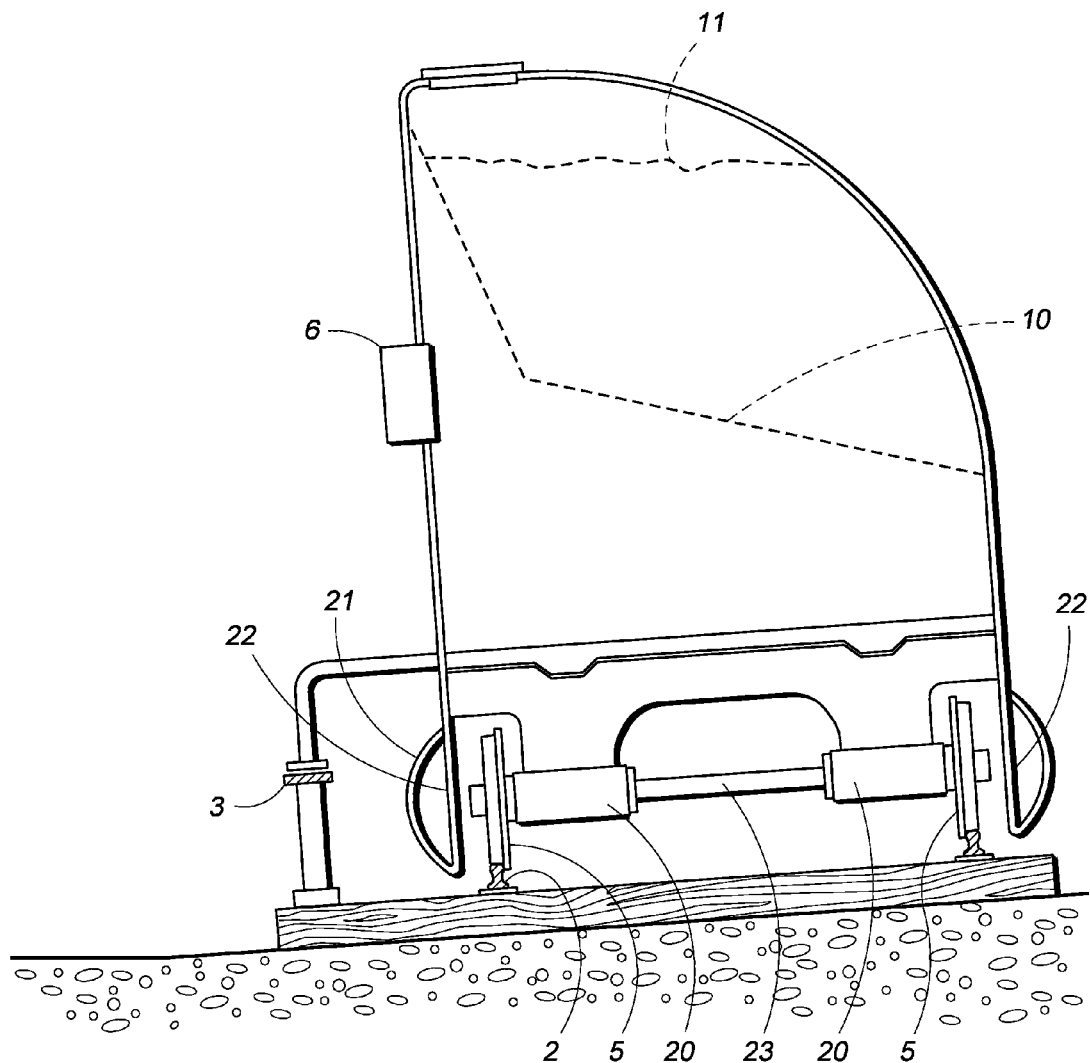
FIG. 4 is an end view of a container shown in FIG. 2, taken along line 4-4.

A top view of one of the containers 4 is shown in FIG. 2, a side view in FIG. 3, and an end view in FIG. 4.

As shown in FIG. 2, each container 4 has several gussets 10 which, with the load-bearing spine 6, retain the loads 11 of gravel or stone within the container 4 against centrifugal forces, the arrangement providing hoop strength to the entire moving aggregation of containers 4. Openings 12 on the top side of the containers 4 are used to fill the containers 4 with the loads 11 of gravel or stone; water could be used instead, with the openings 12 closed. The load-bearing spines 6 on the inner faces of the containers 4 are joined together using coupling mechanisms 7. The movement of the containers 4 is guided by the steel conveyer track 2 having a "third rail" electric conductor 3. As a safety measure for centrifugal loads, an interconnected cinch cable 18 can be horizontally affixed to the outer faces of the containers 4 in order to assist in holding the moving containers 4 together, end to end, for added hoop strength. Fairings 19, made from hinged metal strips or weather-resistant fabric, can be used at the end of each of the containers 4 to reduce frictional forces and increase the round trip efficiency of the system.

Figure 2A:
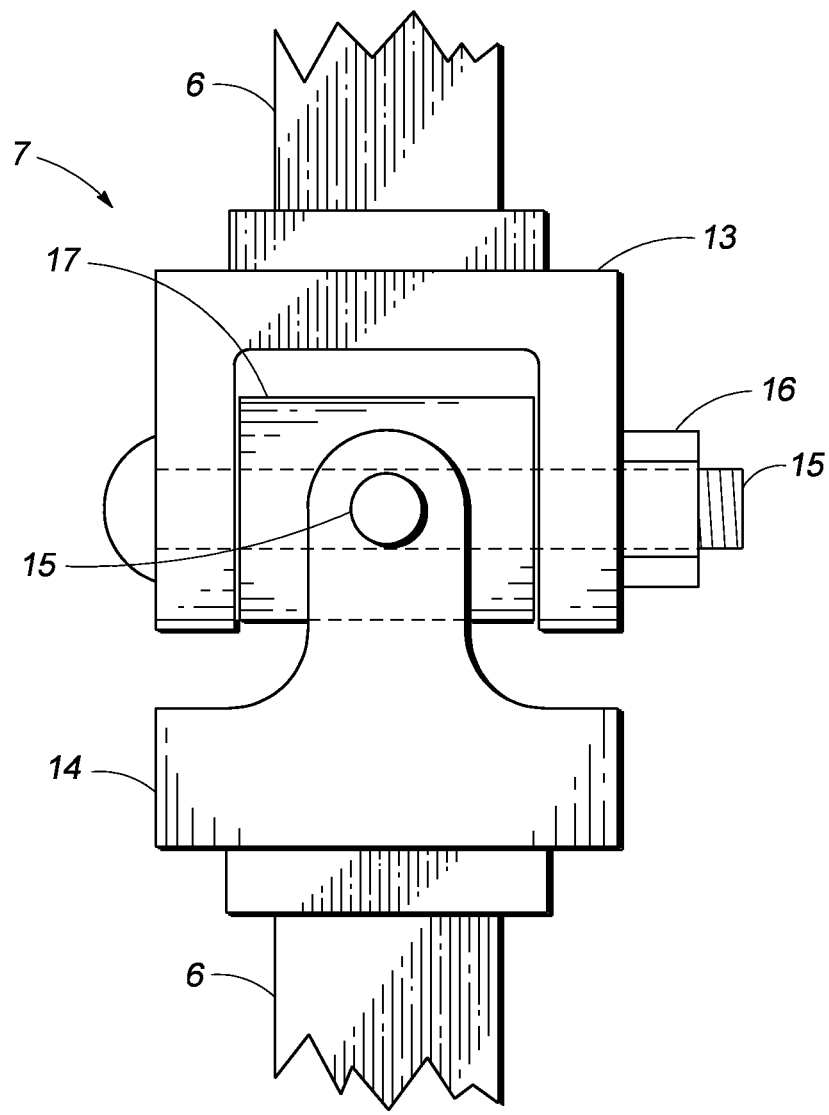
FIG. 2A is a detail drawing of the coupling mechanism shown in FIG. 2.

As shown in FIG. 2A, a typical coupling mechanism 7 is a universal joint comprising a first bracket 13 and a second bracket 14, each attached to the load-bearing spine 6. The two brackets 13, 14 have identical components, including a main bolt 15 and a bolt retainer or nut 16 and a spacer 17. The main bolts 15 and the brackets 13, 14 are always orthogonal to each other, enabling the transmission of torque or force at different angles between the interlinked spine 6.

As shown in FIG. 3, each container 4 can be supported on wheels 5, which are guided by the conveyor track 2. Air circulation for cooling the linear motor/generator (20, not shown) is provided by louvers 21 on the outer container shell skirt 22. The load-bearing spines 6 on the inner hoop faces of the containers 4 connect them together using bolted coupling mechanisms 7. Power is conducted to and from the SMCC system 1 through a third rail 3 or from an overhead electric cable (not shown).

The combination of the load-bearing spines 6 and the hub and spoke configuration using rods and cables and/or outer perimeter cinch cables 18 enables the structural formation of a very large diameter, high-velocity, high-mass flywheel riding on a conveyor track utilizing either magnetic levitation or electric traction motor/generator integrated into wheel axle trucks. A motor-generator can be used to describe a single power transducer that can be used as either an electric motor or generator, thereby converting between mechanical power and electrical power.

FIG. 4, illustrates the wheels 5 supporting the container 4 and the linear motor/generators 20. Commercial electric rail drive systems incorporate a motor/generator 20 connected directly to the rail wheel set axle 23, and are well adaptable to a SMCC system 1 for mass energy storage and regenerative power delivery. Wheel set axles 23 are aligned to the radial center of ring, i.e., not straight, to reduce friction. Power to and from the linear motor/generators 20 and or the wheel motor/generator wheelsets 23 is conducted from a third rail 3 or from an overhead electric cable (not shown). Typically, a third rail is used to supply electric power to an electric locomotive through a continuous rigid conductor placed alongside, above or between the rails of a railway track. Here, the third rail 3 is shown adjacent to the conveyor track 2 forming a "slip ring" conductor for each mass container 4 drive system. An electric grid (not shown) supplies or receives electric power through the third rail 3. The third rail 3 connects to a substation for voltage adjustment and interconnection to the electric grid. Air circulation for cooling the motor/generators 20 is provided by louvers 21 on the outer container shell skirt 22.

Figure 5:
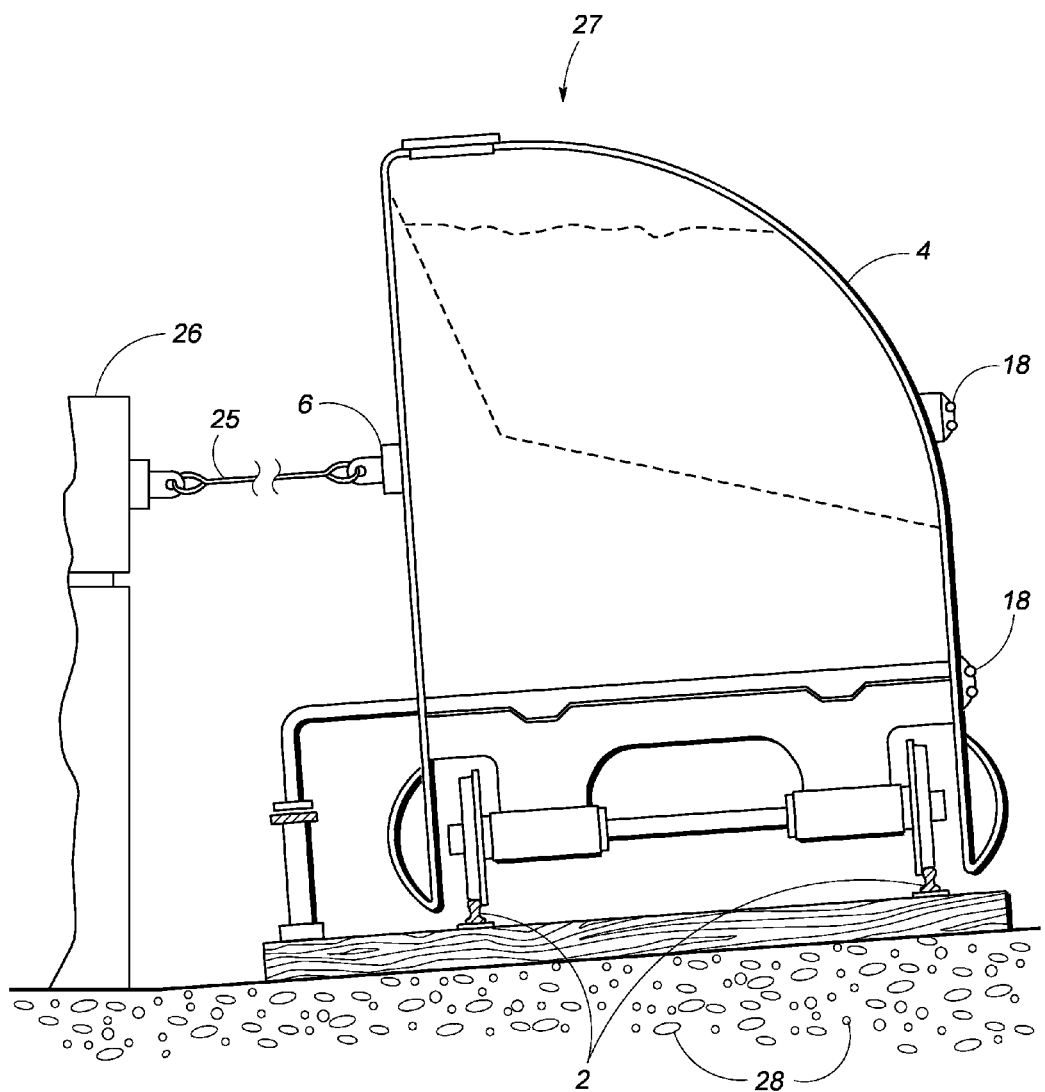
FIG. 5 is an end view of a container supported on a banked conveyor track and having an inner side attached with a rod or cable to a central hub.

As shown in FIG. 5, restraining the overturning forces on the SMCC system 1 in motion can also be accomplished by attaching one end of a rod or cable 25 to the load-bearing spine 6 and connecting the opposite end of the rod or cable 25 to a hub 26 in the center of the conveyor track 2, resulting in a configuration similar to the spokes on a bicycle wheel. This approach generally applies to SMCC systems 27 which are smaller in diameter than the SMCC 1 shown in FIG. 1, typically to ones operating at high speed. As shown in FIG. 5, the conveyor track 2 can be banked, using ballast 28, such as limestone, trap rock, granite, or slag, in order to reduce the overturning forces of the containers 4. One or more cinch cables 18 can be affixed to the outer faces of the containers 4 for added hoop strength.

Figure 6:
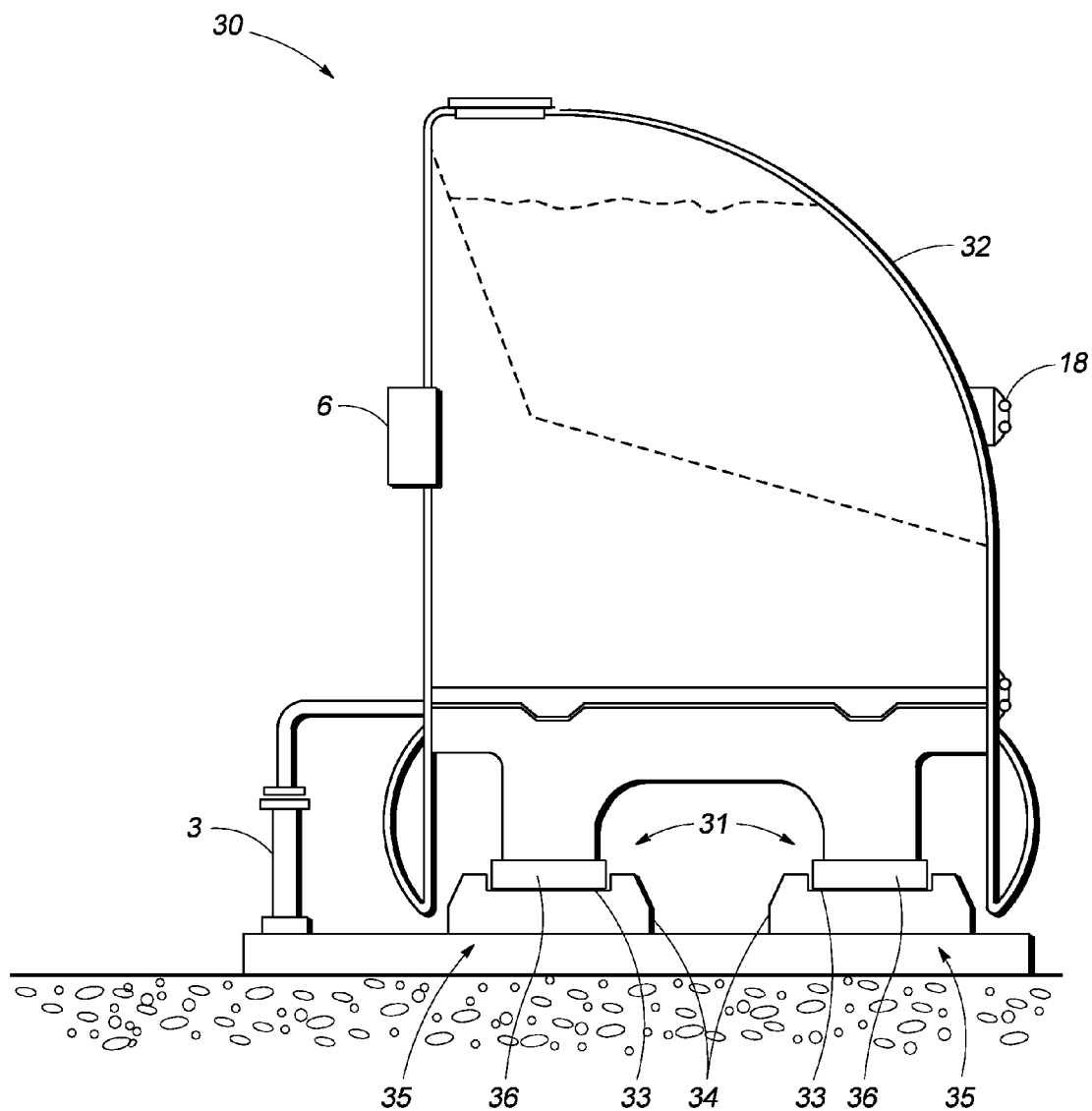
FIG. 6 is an end view of one of the containers of an alternate embodiment of the present invention, which utilizes magnetic levitation and a linear electric motor generator.

Another embodiment of the present invention is shown in FIG. 6. This SMCC system 30 uses magnetic levitation and a linear electric motor/generator 31. In this embodiment, the containers 32 are raised on a magnetic field 33 and driven by a linear electric motor 31 with the stator 34 embedded in the magnetic levitation track 35, and the rotor 36 attached to the undersurface of the container 32. Power from the grid travels via the third rail 3 in order to propel the ring of containers 32 and to store energy. When the grid needs to draw power from storage, the linear electric motor 31 acts as a generator and supplies power to the grid by converting the mass momentum into electric power.

The ring of segmented containers 4, 32 structurally forms a hoop by the coupling of the load-bearing spine 6, and by one or more (optional) interconnected cinch cables 18 around the outer perimeter of the ring of containers so no overturning moments of the containers 4, 32 are transferred to the conveyor track 2. The structure of the coupled containers 4, 32 forms a coherent, circular segmented mass, eliminating or reducing side loading on the wheels 5, the conveyor track 2, or on the magnetic levitation track 35, and prevents the derailing or tilting of the containers 4.

Figure 7:
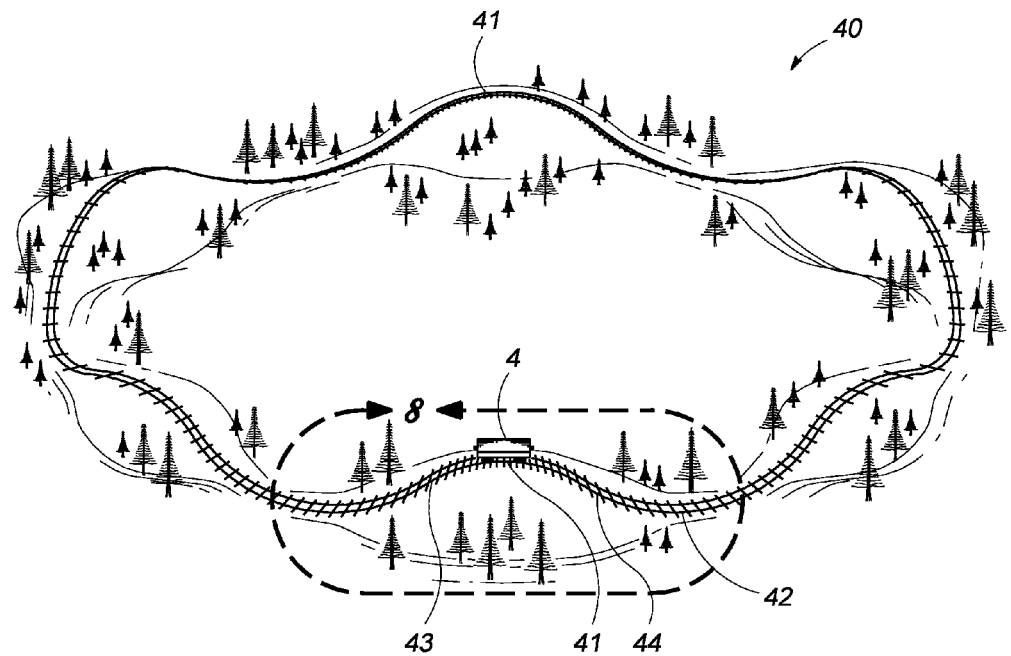
FIG. 7 is a representational view of an embodiment of the supporting track for the present invention which incorporates continuous slopes in order to introduce gravitational forces into the system.
Figure 8:
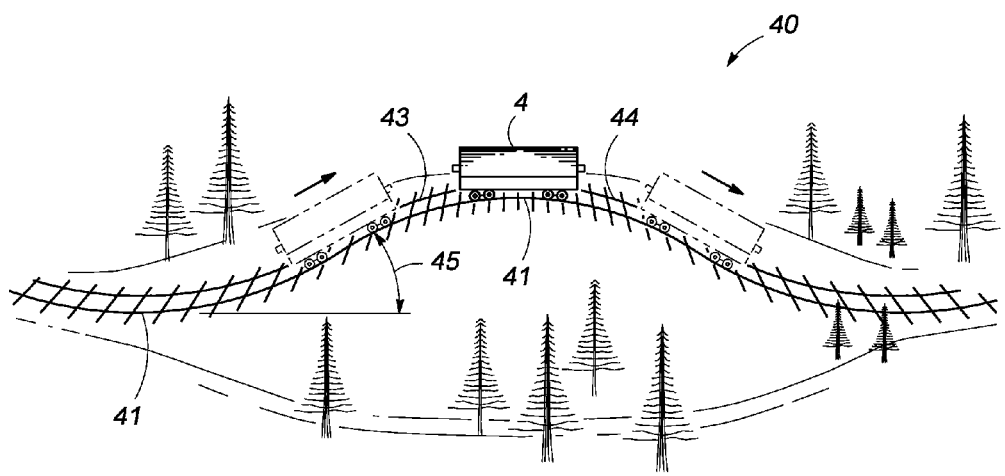
FIG. 8 is a detailed view of a section of the sloped track shown in FIG. 7.

The round trip efficiency of an alternate SMCC system 40 can be increased by introducing slopes 41 into the configuration of the conveyor track 40. Both drag and friction are irreversible forces that act on the SMCC system 40 at all times: drag increases with speed, while friction is constant for a given weight and contact surface. By introducing continuous constant slopes 41 at a predetermined angle into the circular conveyor track 42 (typically having a radius greater than ninety (90) meters), as shown in FIG. 7, a conservative gravitational force is introduced into the SMCC system 40. The angle of inclination of the slopes 41 formed can be as high as thirty degrees (30°). The slopes 41 may be natural ones already present in a particular terrain, or they may be man-made, using a combination of dirt, sand, rock, or a structure made from steel or wood.

As a portion of the SMCC system 40 enters an inclining slope 43, potential energy will be stored, to be converted into kinetic energy later in the declining slope 44. Given the conservative nature of gravity, all of the energy stored as potential energy (as determined by the difference in elevation) can be converted to kinetic energy on the declining slope 44 (less the losses due to friction and drag). As shown in FIG. 7, an added benefit of the slopes 41 is that, by having any portion of the SMCC system 40 on a slope 41 (either an incline or decline), the friction between the SMCC system 40 and the conveyor track 42 (assuming magnetic levitation is not used) is reduced proportionally to the cosine of the slope angle, regardless of whether the slope 41 is an incline or decline. As the angle of the slope 41 increases, the cosine of the angle decreases in value (cosine is maximum at an angle of zero), further reducing the normal force of the SMCC system 40 on the surface of the track 42 and, consequently, the friction force.

Overall, the introduction of slopes 40 in the conveyor track 42 of the SMCC system 40 can significantly improve the round trip efficiency of the system by reducing the rate of energy decay by storing kinetic energy as potential energy and by reducing the losses due to friction of the system. However, the introduction of slopes 41 into the SMCC system 40 will increase the capital costs of the system due to the labor and materials used to build the slopes 41, the corresponding increase in length of the conveyor track 42, and the higher power capacity the SMCC system 40 requires in order to climb the inclining slopes 43 during recharging. The introduction of slopes 41 will also increase the average operating speed of the SMCC system 40, which will increase drag. The optimal combination of degree of slope 41 and length of slope 41 needs to be determined for a particular energy cost-price spread, using the algorithm in FIG. 10, infra.

Figure 9:
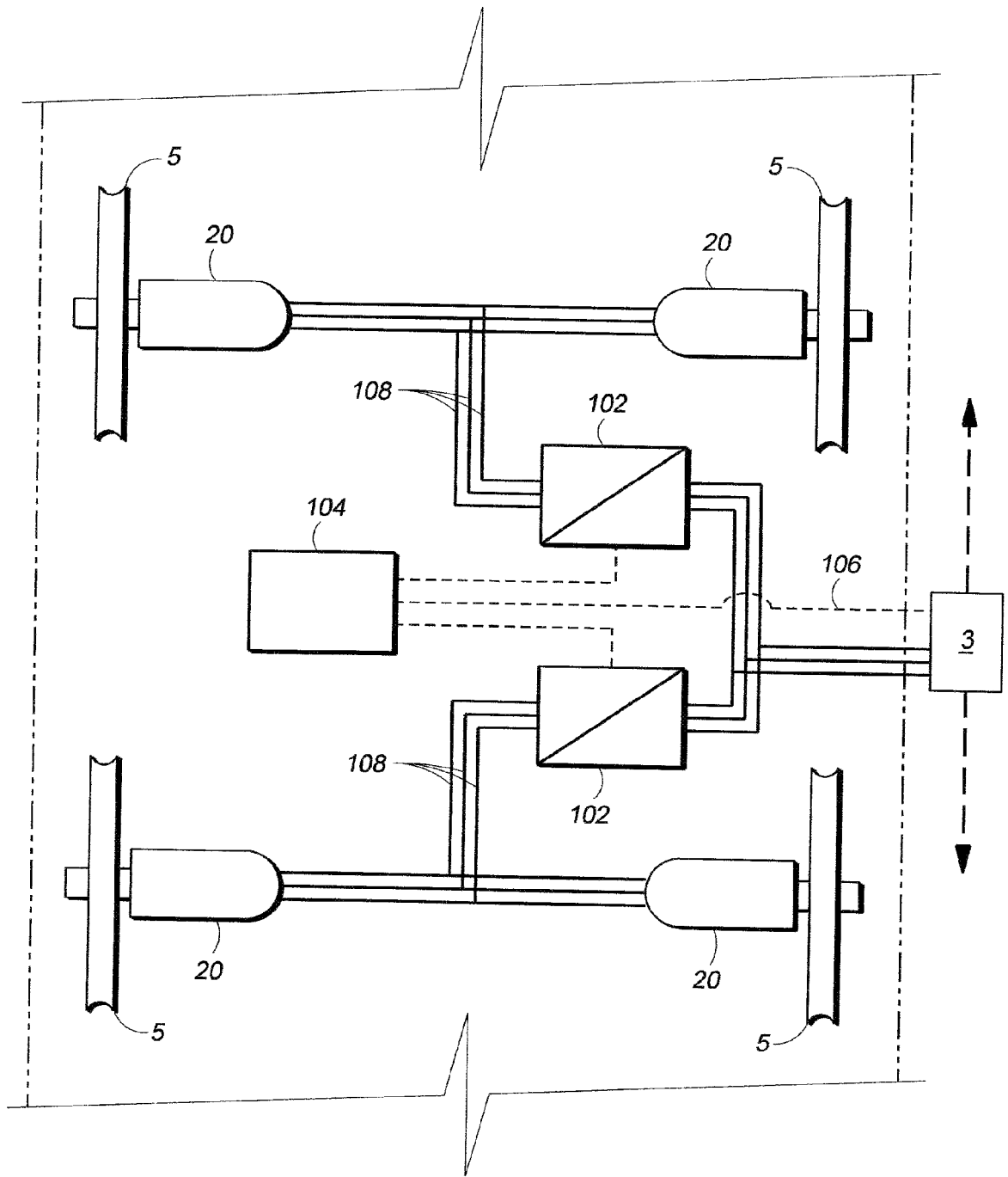
FIG. 9 is a block diagram of the electrical system for the present invention.

FIG. 9 is a block diagram showing the components of a typical electrical system of an SMCC system of the present invention. The wheels 5 under the container 4 are directly coupled to induction or synchronous motors/generators 20 shown in FIG. 4. The motor/generators 20 are three-phase devices, and their corresponding electrical connections are tied together on two of the four motor/generators 20. By connecting the two motor/generators 20 in parallel, these two devices are controlled as a single induction or synchronous generator. This approach is then duplicated on the other end of the container which leads to two inverters 102 per container 4. The line side, or utility side of the inverters 102 are also three-phase and are electrically connected on the utility side make a galvanic connection to the third rail 3 thru the slip ring assembly. At this point, power is passed from the utility to the motor/generators 20 on the container 4 for accelerating the container 4, or power is extracted from the motor/generators on the container 4 and provided to the utility system. In addition to the power being transmitted from the moving container frame to the stationary utility frame over the power cable 108, it is necessary to transmit a communication signal from the stationary frame to the moving frame. This signal connection is shown at 106. The signal connection, once on the container, reports to the container controller 104. The container controller contains the intelligence of the container and is responsible for receiving commands from the utility telling the container to provide, or absorb, power to, or from the utility respectively. Additionally, the container controller coordinates power from the two inverters, ensuring that a power balance exists. Other container controller tasks include fault monitoring, and auxiliary and hierarchical system control. The inverter 102 is a regenerative inverter system with the ability to pass power in two directions, from the utility to the motors/generators 20 during periods of acceleration and then reversing power, using the motor/generators 20 as generators and providing power to the utility. The inverter 102 takes its direction from the container controller 104, which in turn is directed by the utility's requirements.

Figure 10:
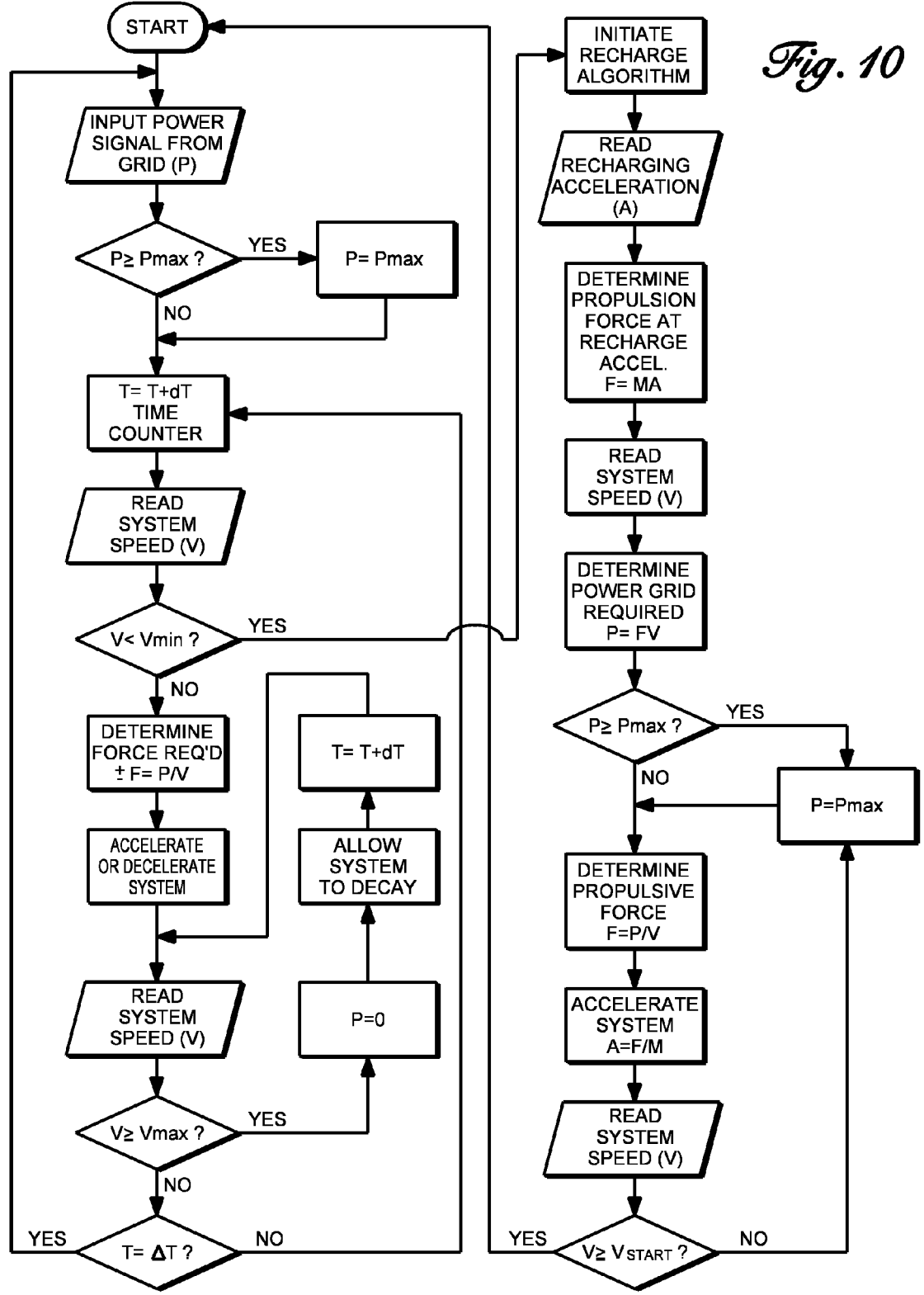
FIG. 10 is a flow diagram showing the basic algorithm which governs the system of the present invention.

The algorithm that controls the system is shown in FIG. 10, described below in greater detail. The overall functioning of the system can also be described in more general terms.

Typically, a flywheel energy storage system accelerates a rotor or flywheel to a high speed, thereby maintaining the energy in the system as rotational energy. When energy is extracted from the system, the flywheel's rotational speed is reduced as a consequence of the principle of conservation of energy. Adding energy to the system results in a corresponding increase in the rotational speed of the flywheel. The electric grid requires a flywheel system to have a starting operating speed equivalent to the speed corresponding to 50% of its maximum energy storage capacity in kilowatt hours (kwh). When the device reaches this starting condition, it engages with the grid and receives an essentially random signal every few seconds that indicates if the grid needs to have it store or deliver energy. The system described herein continues to operate in this fashion until its energy losses, which are a combination of friction, drag forces, and the energy delivered to the grid, cause it to slow to a minimum operating speed, at which it can no longer provide frequency regulation or other ancillary services. At that point, it will draw energy from the grid in order to accelerate (recharge) to its starting operating speed, at which point it reengages with the grid to store and deliver energy according to the grid signal. This type of operating methodology seeks to minimize the energy losses and maximize the round trip efficiency of the system.

Because air drag forces increase with the square of the speed of the system, the average operating speed of the system, defined as the simple average over a predetermined time interval (usually 24 hours), should be as low as possible in order to minimize air drag and increase the efficiency of the system. In order to achieve a higher "round trip" efficiency, which is defined as the total energy delivered divided by the total energy stored including system losses, the minimum operating speed should be as low as possible and the maximum operating speed should also be as low as possible but no lower than the speed at which the gross margin of the system is maximized. The gross margin of the system is determined as the ratio of the revenue of both storing and delivering energy divided by the cost of the energy to recharge the system. The revenue is defined as the product of total energy (kwh) stored and delivered times the price received for this service in $/kwh. The cost is defined as the product of the energy (kwh) used to recharge the system times the cost of this energy in $/kwh. Typically, the cost of the energy to recharge is approximately 50% higher than the price received to store or deliver energy to the grid.

This negative spread, between the price received and the cost paid for energy, requires that the round trip efficiency be as high as possible in order to maximize gross margin and the return on investment in a system used in frequency regulation. Another important variable to maximize gross margin is to minimize the time required for the system to return online (recharge) after it has reached its minimum operating speed. This can be achieved by increasing the power capacity of the system in Watts and, consequently, its driving force, which will increase the acceleration of the system in order to minimize the recharging time. While this can materially improve the gross margin of the system, it also increases the initial capital required and, therefore, affects the return on invested capital. The optimal operating point for a system will be driven by the energy cost price spread and by the combination of minimum speed, maximum speed and system power capacity that maximizes round trip efficiency while optimizing gross margin and return on invested capital.

As shown in the flow diagram of FIG. 10, the basic algorithm controlling the system is driven by the input of a grid signal, which varies every few seconds, typically every 4 seconds. The control system reads the grid signal to determine whether the grid needs to store or to deliver power. The grid signal ranges from negative maximum power to positive maximum power, and fractions in between, depending on whether it needs to deliver or store energy. The system stores this value until the next reading at a pre-established time interval, i.e., 4 seconds. If the value of the power signal is greater than the maximum power capacity of the system (in absolute terms), the maximum power allowed by the system ($P_{max}$) is substituted for the power signal, with the sign of the grid signal being retained to indicate whether the system needs to deliver or to store energy. Once this has occurred, a time counter is initiated and increased by a fraction of a second (about 1/100) corresponding to the system's "refreshing" frequency (denoted by dT), which needs to be high enough to ensure accuracy. Once the time counter is initiated, the system reads its current speed (V) from an onboard speed sensor and compares the current speed with the minimum speed allowed ($V_{min}$). The minimum speed is determined by the minimum speed needed to overcome the next slope if slopes are present in the system, or, simply, the minimum speed needed to guarantee movement before the next iteration in the control system and to keep the system from halting.

If the current speed is below the minimum speed required, a recharge algorithm is initiated. During recharging, the object is to increase the speed of the system to its starting velocity denoted by $V_{start}$. The starting velocity for a system is defined as the speed at which the system has 50% of the maximum energy it can store. This allows the system to start operating at a mid-energy point, which enables it to store or to deliver energy, depending on grid requirements. The first step in the recharge process is for the system to read the recharging acceleration (A) defined by the system, which is limited by the power capacity of the system. The higher this acceleration, the more quickly the system will be back online, thereby increasing the round trip efficiency (RTE) of the system; however, increasing the power capacity also increases the initial cost of the system. After the acceleration (A) is read, the force of propulsion ($F_{RC}$) is determined by multiplying the mass (m) of the system, in kilograms, by the acceleration (A). Using the known speed (V) of the system, the required power (P) is determined. If the power (P) required exceeds the maximum power ($P_{max}$) of the system, the maximum power ($P_{max}$) is used. The system is then accelerated, and the speed (V) of the system is continuously compared against the desired starting speed (V start). If the speed (V) is below the starting speed required, the system continuous to accelerate with a force (F) that does not exceed the maximum power ($P_{max}$) allowed by the system; in other words, the system accelerates at a maximum power by varying the force (or torque) required as the speed increases. Once the starting speed ($V_{start}$) is reached, the system returns to an "online" mode and reads the signal from the grid.

If the current speed (V) is greater than the minimum speed ($V_{min}$), the force (F) corresponding to the grid signal (P) is applied (positive or negative), and the system speed is read. If the system speed (V) is greater than the maximum allowable speed, the system external force is set to zero and it is allowed to decay under friction and drag forces. Once the speed of the system is below the maximum allowable, the time counter (T), in seconds, is compared to the system "refreshing" frequency ($\Delta T$); if the elapsed time is greater than or equal to $\Delta T$, then the system once again reads the signal from the grid (P) and repeats the cycle. If the time counter (T) is less than $\Delta T$, then the system adds dT to the time counter (T) and repeats the cycle by using the grid signal (P) already in memory.

It will be understood by those skilled in the art that the embodiments of the present invention are not described with reference to any particular source of energy, but can be used with any source of power, including: solar; fossil fuels, such as diesel motor-generator sets and gas turbines; nuclear fuels, such as steam turbines for nuclear power plants; bio-energy technologies, such as using renewable plant material or animal wastes; thermal; automotive, such as electric cars; microturbines, such as those using natural gas, gas from landfills, or digester gas; marine drives; and heavy equipment.

We claim:

1. A bulk energy storage system for use with a power grid, the system comprising:
   a plurality of masses coupled together end to end to form a ring of masses;
   a ring-shaped electric-powered conveyor for guiding the masses traveling thereon;
   an electrical conductor connecting the conveyor to the power grid;
   a plurality of motor/generators, one or more of said motor/generators mounted on each of the masses, the motor/generators engaged with the electrical conductor for receiving power from the power grid, for energy storage, and for regenerative power delivery to the power grid; and
   a continuous load-bearing spine disposed on an inner surface of the ring of masses.

2. The system of claim 1 which further comprises a continuous cinch cable disposed on an outer surface of the ring of masses.

3. The system of claim 1 which further comprises:
   a hub disposed fixed in a central location inside the conveyor track; and a plurality of rods, each of the rods having a first end and a second end, the first end of each said rod being affixed to the hub and the second end of each said rod being affixed to the load-bearing spine.

4. The system of claim 1 which further comprises:
a hub disposed fixed in a central location inside the conveyor track; and
a plurality of cables, each of the cables having a first end and a second end, the first end of each said cable being affixed to the hub and the second end of each said cable being affixed to the load-bearing spine.

5. A bulk energy storage system for use with a power grid, the system comprising:
a plurality of masses coupled together end to end to form a ring of masses;
a ring-shaped electric-powered conveyor for guiding the masses traveling thereon, the conveyor being configured to have a plurality of slopes;
an electrical conductor connecting the conveyor to the power grid;
a plurality of motor/generators, one or more of said motor/generators mounted on each of the masses, the motor/generators engaged with the electrical conductor for receiving power from the power grid, for energy storage, and for regenerative power delivery to the power grid; and
a continuous load-bearing spine disposed on an inner surface of the ring of masses.

6. The system of claim 5 which further comprises a continuous cinch cable disposed on an outer surface of the ring of masses.

7. A bulk energy storage system for use with a power grid, the system comprising:
a plurality of masses coupled together end to end to form a ring of masses;
a ring-shaped magnetic-levitation track for raising and guiding the masses traveling thereon;
an electrical conductor connecting the magnetic levitation track to the power grid, the electrical conductor being either a third rail or an overhead electrical cable;
a plurality of linear electric motors connected to the electrical conductor, each of said motors having a stator embedded in the magnetic levitation track and a rotor attached to a bottom surface of one of the masses, each of the motors receiving power from the power grid through the electrical conductor in order the propel the ring of masses, each of the motors further acting as a generator when delivering power to the power grid; and
a continuous load-bearing spine disposed on an inner surface of the ring of masses.

8. The system of claim 7 which further comprises a continuous cinch cable disposed on an outer surface of the ring of masses.

9. The system of claim 7 which further comprises:
a hub disposed fixed in a central location inside the conveyor track; and
a plurality of rods, each of the rods having a first end and a second end, the first end of each said rod being affixed to the hub and the second end of each said rod being affixed to the load-bearing spine.

10. The system of claim 7 which further comprises:
a hub disposed fixed in a central location inside the conveyor track; and
a plurality of cables, each of the cables having a first end and a second end, the first end of each said cable being affixed to the hub and the second end of each said cable being affixed to the load-bearing spine.

* * * * *